March 5, 1940.  A. D. AMES  2,192,426
SHAFT SEAL
Filed July 25, 1938
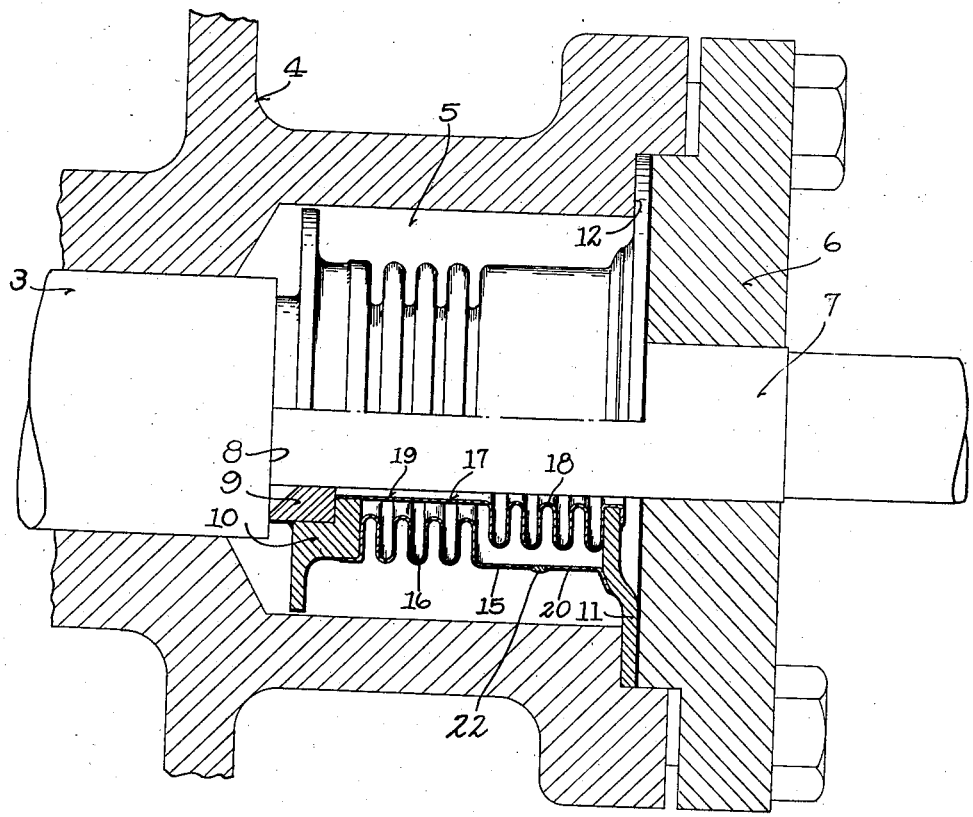
INVENTOR.
ARTHUR D. AMES
BY
Wheeler, Wheeler & Wheeler
ATTORNEYS.

Patented Mar. 5, 1940

2,192,426

UNITED STATES PATENT OFFICE 2,192,426

SHAFT SEAL

Arthur D. Ames, Lake Bracken, Ill., assignor to Outboard, Marine & Manufacturing Company, Waukegan, Ill., a corporation of Delaware Application July 25, 1938, Serial No. 221,107

5 Claims. (Cl. 286—11)

This invention relates to improvements in shaft seals.

It is the object of the present invention to provide a novel and improved shaft seal employing gaseous or vapor pressure for the expansion of inner and outer walls each provided with a bellows, the bellows of the inner wall and the bellows of the outer wall being in radially overlapped staggered relation for economy and space.

Other objects will appear from the following disclosure.

The drawing shows an axial section of a seal embodying this invention, with the internal mechanism illustrated partially in side elevation and partially in section.

The shaft 3 is provided with a bearing in the housing member 4, which, by way of illustration, may be taken to be the crank case of a compressor. Within housing 4 is a seal chamber 5 capped by a closure 6, having a bearing for the reduced portion 7 of the shaft. In accordance with conventional practice, the shaft is encircled adjacent shoulder 8 by a ring 9, over which seats the socketed terminal member 10 of the seal. The opposite terminal member 11 of the seal is clamped between the closure 6 and the co-acting surface 12 of housing 4.

In accordance with the preferred practice of the invention, the terminal members 10 and 11 are connected by inner and outer bellows, and the gas or vapor which furnishes the pressure for the expansion of the seal is confined between such bellows. The outer bellows 15 has all of its convolutions 16 adjacent its left hand end and the inner bellows 17 has all of its convolutions 18 adjacent its right hand end. A sleeve-like extension 19 of the inner bellows projects through the convoluted portion 16 of the outer bellows into engagement with the inner terminal ring 10 of the seal, and, similarly, a sleeve-like extension 20 of the outer bellows projects past the convoluted portion 18 of the inner bellows into connection with the terminal ring 11 of the seal.

The solder at 22 closes an opening in the sleeve portion 20 of the outer bellows through which the material for producing gas or vapor pressure for the expansion of the bellows was introduced.

It is obviously immaterial what substance is employed to create the requisite pressure. It is likewise immaterial how much pressure is needed. Air, carbon dioxide, or any other gas or mixture of gases which will remain wholly or partly in gaseous state at the temperatures at which the device operates may be used. It is likewise possible to introduce some liquids, or even solids, such, for example, as liquid ammonia or frozen carbon dioxide, which, in their vaporization or sublimation, will give off the gas or vapor to create the desired degree of pressure.

Since the sealing device as illustrated has various convolutions it will expand and contract freely in an axial direction but will not yield appreciably in a radial direction. Thus all, or substantially all, of the gas pressure applied within the bellows will be exerted in a direction to expand the seal, thereby separating the terminal rings 10 and 11. Since the ring 11 is fixed in the constructions shown, the expansion will take place in a direction to urge ring 10 to a tight seat upon the annulus 9 and to maintain the annulus 9 tightly seated upon the shoulder 8 of shaft 3.

In actual tests the uniformity of pressure achieved in this method and the possibility of controlling the pressure with greater accuracy than it is possible to achieve in the production manufacture of springs, and also the possibility of producing increases of pressure corresponding to temperature increases to which the device may be subject, all represent advantages of the present device as compared with the more conventional spring actuated seal.

I claim:

1. In a seal, the combination with terminal members, of inner and outer wall elements in connection therewith, said elements having staggered bellows portions, and each having a sleeve portion radially overlapping the bellows portion of the other.

2. In a seal, an inner bellows member having a sleeve portion and a convoluted bellows portion, an outer bellows member having a sleeve portion radially overlapping the convoluted bellows portion of the first member and a convoluted bellows portion radially overlapping the sleeve portion of the first member, and means connecting the overlapping ends of the respective members.

3. In a seal, the combination of a wall element of annular form comprising relatively extensible and non-extensible portions, a concentric annular wall element having a non-extensible portion radially overlapping the extensible portion of the first wall element, and an extensible portion radially overlapping the non-extensible portion of the first wall element, and means hermetically connecting the ends of the respective wall elements to constitute a closed chamber therebetween.

4. In a seal, the combination with a first wall element comprising a convoluted axially extensible portion and an adjacent tubular portion, of a second wall element comprising a tubular portion radially overlapping the convoluted portion of the first element and axially extensible means radially overlapping the tubular portion of the first element, and means hermetically connecting the ends of the first and second elements to constitute a closed chamber.

5. In a seal, the combination with terminal members of inner and outer axially expansible elements hermetically connected to the respective members, the inner of said elements comprising a tube of relatively small diameter for a portion of its length and a bellows of larger over-all diameter for the remainder of its length, and the outer of said elements comprising a tubular portion of relatively large diameter surrounding the bellows of the inner element and a bellows of relatively small internal diameter surrounding the tubular portion of the inner element, the internal radius of the bellows of the outer element being less than the external radius of the bellows of the inner element, whereby to provide for the free expansion and contraction of both elements with economy of space.

ARTHUR D. AMES.